US012756559B2

(12) United States Patent
Deshpande

(10) Patent No.: US 12,756,559 B2
(45) Date of Patent: *Oct. 6, 2026

(54) PRIVACY SAFE JOINT IDENTIFICATION PROTOCOL

(71) Applicant: Snap Inc., Santa Monica, CA (US)

(72) Inventor: Apoorvaa Deshpande, Mountain View, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,931

(22) Filed: Jan. 30, 2024

(65) Prior Publication Data

US 2024/0259200 A1 Aug. 1, 2024

Related U.S. Application Data

(63) Continuation of application No. 17/443,036, filed on Jul. 20, 2021, now Pat. No. 11,943,354.

(51) Int. Cl.

| | |
|---|---|
| ***H04L 9/32*** | (2006.01) |
| ***G06F 21/62*** | (2013.01) |
| ***H04L 9/08*** | (2006.01) |

(52) U.S. Cl.

CPC ............ *H04L 9/32* (2013.01); *G06F 21/6245* (2013.01); *H04L 9/088* (2013.01)

(58) Field of Classification Search

None

See application file for complete search history.

(56) References Cited

U.S. PATENT DOCUMENTS

| | | | | |
|---|---|---|---|---|
| 11,943,354 | B2 * | 3/2024 | Deshpande | H04L 9/32 |
| 2015/0081562 | A1 * | 3/2015 | Roullier | H04L 9/0894 705/50 |
| 2015/0288665 | A1 * | 10/2015 | El Emam | H04L 9/008 713/171 |

(Continued)

FOREIGN PATENT DOCUMENTS

| | | |
|---|---|---|
| CN | 110622165 A | 12/2019 |
| CN | 111919216 A | 11/2020 |

(Continued)

OTHER PUBLICATIONS

"U.S. Appl. No. 17/443,036, Examiner Interview Summary mailed May 23, 2023", 2 pgs.

(Continued)

*Primary Examiner* — Benjamin E Lanier
*Assistant Examiner* — Felicia Farrow
(74) *Attorney, Agent, or Firm* — Schwegman Lundberg & Woessner, P.A.

(57) ABSTRACT

The technical problem of matching records in different datasets, for example a host dataset and a partner dataset storing records representing respective users, while maintaining the privacy of each dataset, is addressed by providing a privacy safe joint identification protocol. The privacy safe joint identification protocol computes respective anonymous joint identifiers for records in the two datasets. An anonymous joint identifier is generated such that the host-assigned and the partner-assigned identifies that have been determined to represent the same user are mapped to the same anonymous joint identifier.

20 Claims, 5 Drawing Sheets

(56) References Cited

U.S. PATENT DOCUMENTS

| | | | |
|---|---|---|---|
| 2017/0230184 A1 | 8/2017 | Alwarappan et al. | |
| 2018/0218168 A1* | 8/2018 | Goel | G06F 21/6245 |
| 2018/0218173 A1 | 8/2018 | Perkins et al. | |
| 2018/0254893 A1* | 9/2018 | Saxena | H04L 9/083 |
| 2022/0284114 A1 | 9/2022 | Klein et al. | |
| 2023/0045553 A1 | 2/2023 | Deshpande | |

FOREIGN PATENT DOCUMENTS

| | | | | |
|---|---|---|---|---|
| CN | 112966168 A | | 6/2021 | |
| CN | 117678196 A | | 3/2024 | |
| KR | 20210061426 A | | 5/2021 | |
| WO | WO-2005101215 A1 | * | 10/2005 | G11B 20/00086 |
| WO | WO-2016122513 A1 | | 8/2016 | |
| WO | WO-2018169584 A1 | | 9/2018 | |
| WO | WO-2019204711 A1 | | 10/2019 | |
| WO | WO-2023004360 A1 | | 1/2023 | |

OTHER PUBLICATIONS

"U.S. Appl. No. 17/443,036, Examiner Interview Summary mailed Oct. 17, 2023", 2 pgs.
"U.S. Appl. No. 17/443,036, Final Office Action mailed Jun. 28, 2023", 21 pgs.
"U.S. Appl. No. 17/443,036, Non Final Office Action mailed Mar. 9, 2023", 23 pgs.
"U.S. Appl. No. 17/443,036, Notice of Allowance mailed Nov. 17, 2023", 8 pgs.
"U.S. Appl. No. 17/443,036, Response filed Jun. 8, 2023 to Non Final Office Action mailed Mar. 9, 2023", 11 pgs.
"U.S. Appl. No. 17/443,036, Response filed Sep. 27, 2023 to Final Office Action mailed Jun. 28, 2023", 10 pgs.
"International Application Serial No. PCT/US2022/073959, International Search Report mailed Oct. 26, 2022", 4 pgs.
"International Application Serial No. PCT/US2022/073959, Written Opinion mailed Oct. 26, 2022", 10 pgs.
"International Application Serial No. PCT/US2022/073959, International Preliminary Report on Patentability mailed Feb. 1, 2024", 12 pgs.
"European Application Serial No. 22758096.6, Response to Communication Pursuant to Rules 161 and 162 EPC Filed Aug. 27, 2024", 18 pgs.
"Introduction—Homomorphic Encryption Standardization", [Online]. Retrieved from the Internet: <URL: https://homomorphicencryption.org/introduction/>, (Accessed Apr. 3, 2025), 4 pgs.
"User privacy and data use", App Store—Apple Developer, [Online]. Retrieved from the Internet: <URL: https://developer.apple.com/app-store/user-privacy-and-data-use/>, (Accessed Apr. 3, 2025), 7 pgs.
Dachman-Soled, Dana, et al., "Efficient Robust Private Set Intersection", ACNS 2009, LNCS 5536, (2009), 125-142.
"Korean Application Serial No. 10-2024-7005314, Notice of Preliminary Rejection mailed Jul. 18, 2025", w/ English Translation, 11 pgs.
"Korean Application Serial No. 10-2024-7005314, Response Filed Oct. 1, 25 to Notice of Preliminary Rejection mailed Jul. 18, 25", w/ English Claims, 30 pgs.
"Chinese Application Serial No. 202280050396.3, Office Action mailed Mar. 31, 2026", w/ English translation, 24 pgs.

* cited by examiner

PRIVACY SAFE JOINT IDENTIFICATION PROTOCOL

PRIORITY

This application is a continuation of U.S. patent application Ser. No. 17/443,036, filed Jul. 20, 2021, which is incorporated by reference herein in its entirety.

TECHNICAL FIELD

The present disclosure generally relates to data analysis. Specifically, but not by way of limitations, systems and methods herein describe generating anonymous joint identifiers for pairs of datasets in a privacy safe manner.

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, are installed directly onto a mobile device such as a phone, a tablet, or a wearable device. An application may have a backend service provided on a server computer system to perform operations that may require resources greater than is reasonable to perform at a client device (e.g., storing large amounts of data or performing computationally expensive processing). For example, a messaging client and the associated messaging server system may be configured to permit online users to share content. An application, such as a messaging client, may be configured to display external content that originates from a third party provider, in addition to facilitating content sharing over a network.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
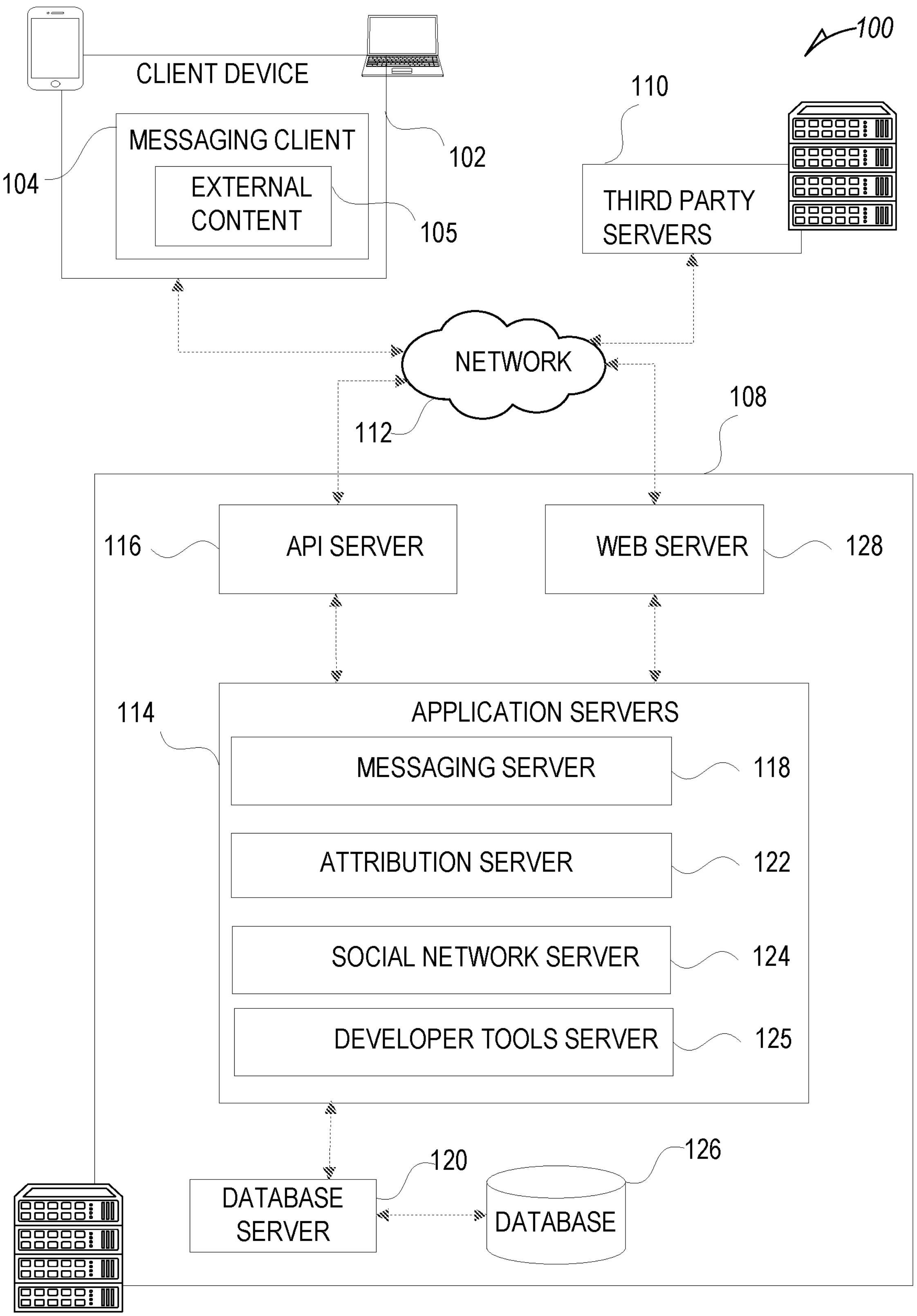
FIG. 1 is a diagrammatic representation of a networked environment, in which a privacy safe joint identification protocol may be deployed, in accordance with some examples.

A computer-implemented application may be configured to display external content, in addition to providing the functionality of the application itself. The effectiveness of a given external content item displayed by an application can be measured by detecting and counting events defined as successful outcomes that follow impressions of the given external content within a predefined period of time. An impression, which indicates that an external content item has been presented to a user of an application, is an event associated with fetching an external content item from its source (a third party system, for example) and displaying it on a screen provided by the application that functions as a delivery system. An event defined as a successful outcome that follows an impression within a predefined period of time is referred to as a conversion. Examples of conversions include events indicating downloading of a third party application, subscribing to a newsletter or enrolling into an on-line class, where such events occurred within a predetermined period of time after an associated external content item was displayed to a user of the application. An attribution process, also referred to as merely attribution, is a process of generating metrics indicative of conversions that follow impressions, such as, for example, how many users that were shown an external content item subsequently performed a certain activity related to the external content item.

Attribution employs private set intersection (PSI) protocol to compute the intersection of the impression dataset and the conversion dataset. PSI is a cryptographic technique that allows two parties holding separate datasets (the impression dataset and the conversion dataset, for example) to compare encrypted versions of those sets in order to compute the intersection in a manner such that neither party exposes any personally identifiable information (PII) to the other party. Some examples of PII include an email address an Internet protocol (IP) address, and a phone number of a user. PSI-size is a secure multiparty computation cryptographic technique that allows two parties to privately join their private datasets and discover the number of identifiers they have in common, or the size of the set intersection.

In some examples, PSI-size is executed with respect to a host dataset (a dataset storing user information maintained by the host system configured to display external content that originates from a third party provider) and a partner dataset (a dataset storing user information maintained by a partner system that provides the external content to the host system). The host system assigns respective internal identifiers (host-assigned identifiers) to its users, and the partner system assigns respective internal identifiers (partner-assigned identifiers) to represent their users. The same user may be identified in the host dataset and in the partner dataset by different internal identifiers. In some examples, an item in a dataset storing user information, whether the host dataset or the partner dataset, is a record comprising an identification of a user (a host-assigned identifier in the host dataset and a partner-assigned identifier in the partner dataset) mapped to a set of PII elements. Examples of PII elements in the dataset records, include an email address, an IP address, and a device identification, for example. The PII elements in the dataset records may be hashed. The intersection between the host dataset and the partner dataset is the number of records that represent the same user in both datasets.

The technical problem of matching records in different datasets, such as a host dataset and a partner dataset, while maintaining the privacy of each dataset, is addressed by providing a privacy safe joint identifier protocol that computes anonymous joint identifiers that can be used for matching user records of the host dataset and the partner dataset in a privacy safe manner. An anonymous joint identifier is generated such that the host-assigned and the partner-assigned identifies that have been determined to represent the same user are mapped to the same anonymous joint identifier.

In one example, the privacy safe joint identifier protocol double-encrypts PII elements from the records of both the host dataset and the partner dataset, using an encryption key provided by the host system and, also, an encryption key provided by the partner system, to double-encrypt the PII elements. As a result, the double-encrypted PII elements cannot be mapped to their associated host-assigned or partner-assigned identifiers, because the host system and the partner system are each in possession of only one of the two encryption keys used to produce the double-encrypted PII elements. The double-encrypted PII elements from both datasets are made available to the host system. At the host system, each double-encrypted version of a PII element from the partner dataset is tagged with an encrypted partner-assigned identifier, and each double-encrypted version of a PII element from a host dataset is tagged with a partner-generated anonymous identifier, which means that the host system cannot determine a mapping of any of the double-encrypted PII elements to a host-assigned identifier. If a PII element (a hashed email address, for example) is present in both the host dataset and the partner dataset, the double-encrypted version of such PII element is tagged with both the associated encrypted partner-assigned identifier and with the associated partner-generated anonymous identifier. The double-encrypted PII elements at the host system are then assigned respective anonymous joint identifiers, in a manner that the double-encrypted PII elements that have been determined to be associated with the same user are assigned the same anonymous joint identifier. The intersection between the host dataset and the partner dataset can be determined as the number of joint identifiers that are used to tag PII elements that have already been tagged with both an associated encrypted partner-assigned identifier and with an associated partner-generated anonymous identifier.

In some examples, the host system provides respective mappings between the anonymous joint identifiers and the encrypted partner-assigned identifiers to the partner system, so that the partner system can tag its partner-assigned identifiers with respective anonymous joint identifiers. The host system generates a random identifier for each anonymous joint identifier and uses the generated random identifiers to obtain, from the partner system, mappings of random identifiers to respective encrypted host-assigned identifiers. In some examples, the host system discards the double-encrypted PII elements prior to obtaining, from the partner system, mappings of random identifiers to respective encrypted host-assigned identifiers, so that the host system is still prevented from determining a mapping of any of the double-encrypted PII elements to a host-assigned identifier. Based on the obtained mappings of random identifiers to respective encrypted host-assigned identifiers, the host system derives any existing mappings between a host-assigned identifier and an anonymous joint identifier. After the anonymous joint identifiers are established between the host dataset and the partner dataset, PSI-size can be executed based on the mappings of the host-assigned identifiers and the anonymous joint identifiers. For example, the size of the intersection between the host dataset and the partner dataset may be calculated as the number of anonymous joint identifiers that are mapped to a host-assigned identifier or a partner-generated anonymous identifier and, also, to an encrypted partner-assigned identifier.

In some examples, PSI-size is executed on a predetermined cadence, such as daily or weekly. An example of the operation of the privacy safe joint identifier protocol can be described as follows.

A host dataset comprising mapping between the host-assigned user identifiers and the respective PII elements, which can be denoted as {SAID_i->[PII_{i, 1}, PII_{i, 2}, . . . ] }, is shown in Table 1 below.

TABLE 1

| Host-assigned IDs | PII elements |
|---|---|
| $SAID_1$ | $he_1$, $d_1$ |
| $SAID_2$ | $he_2$, $d_2$ |
| $SAID_3$ | $he_3$, $d_3$ |

$SAID_1$, $SAID_2$ and $SAID_3$ are user identifiers assigned by the host system; $he_1$, $he_2$ and $he_3$ are hashed email addresses; $d_1$, $d_2$ and $d_3$ are device identifiers.

A partner dataset comprising mapping between the partner-assigned user identifiers and the respective PII elements, which can be denoted as {AFID_j->[PII_{j,1}, PII_{j,2}, . . . ]} are shown in Table 2 below.

TABLE 2

| Partner-assigned IDs | PII elements |
|---|---|
| $AFID_1$ | $he_4$, $d_4$ |
| $AFID_2$ | $he_5$, $d_5$ |
| $AFID_3$ | $he_2$, $d_6$, $d_2$ |

$AFID_1$, $AFID_2$ and $AFID_3$ are user identifiers assigned by the partner system; $he_4$, $he_5$ and $he_6$ are hashed email addresses; $d_4$, $d_5$, $d_6$ and d2 are device identifiers.

At the host system, the protocol generates an Elliptic Curve Cryptography (ECC) key denoted as host_key and a lightweight encryption key denoted as l_key_host. At the partner system, the protocol generates ECC key denoted as partner_key and a lightweight encryption key denoted as l_key_partner. EncH and EncP denote the encryption with the host_key and the partner_key respectively.

In some examples, encrypting an identifier using the i_host_key and the partner_key produces the result expressed in Equation 1 below.

$$EncH(EncP(\text{identifier})) = EncP(EncH(\text{identifier})) \quad \text{Equation 1}$$

EncHL and EncPL denote the encryption with the l_key_host as l_key_partner respectively. Examples of lightweight encryption include Advanced Encryption Standard (AES), pseudorandom function family (PRF), hashing with salt, and so on.

In some examples, at the host system, the host-assigned identifiers from the host dataset are encrypted using the/key_host, and the PII elements from the host dataset are encrypted using the host_key. The PII elements from the host dataset are encrypted using the host_key are tagged with the respective host-assigned identifiers encrypted using the/key_host. The resulting mappings that are shown in Table 3 below can be denoted as:

$$[EncL(\text{SAID\_i}) \rightarrow EncH(\text{PII\_}\{i, 1\}), EncH(\text{PII\_}\{i, 2\}), \ldots].$$

TABLE 3

| Encrypted PII elements from the host dataset | Encrypted Host-assigned IDs |
|---|---|
| EncH($he_1$) | EncHL($SAID_1$) |
| EncH($he_2$) | EncHL($SAID_2$) |
| EncH($he_1$) | EncHL($SAID_3$) |
| EncH($d_1$) | EncHL($SAID_1$) |
| EncH($d_2$) | EncHL($SAID_2$) |
| EncH($d_3$) | EncHL($SAID_3$) |

The PII elements from the host dataset encrypted using the host_key and mapped to respective host-assigned identifiers from the host dataset encrypted using the l_key_host are shuffled and sent to the partner system.

At the partner system, the protocol generates a random identifier (referred to as a partner-generated anonymous identifier for the purposes of this description) for each encrypted host-assigned identifier from the host dataset and stores the resulting mappings as shown in Table 4 below.

TABLE 4

| Encrypted Host-assigned IDs | Partner-generated anonymous IDs |
|---|---|
| EncHL($SAID_1$) | $NID_1$ |
| EncHL($SAID_2$) | $NID_2$ |
| EncHL($SAID_3$) | $NID_3$ |

At the partner system, the protocol shuffles the received encrypted PII elements from the host dataset, encrypts them with the partner_key and tags them with the respective partner-generated anonymous identifiers. The mappings of the resulting double-encrypted PII elements from the host dataset to the respective partner-generated anonymous identifiers are shown in Table 5 below.

TABLE 5

| Double encrypted PII elements from the Host dataset | Partner-generated anonymous identifiers |
|---|---|
| EncP(EncH( $he_1$)) | $NID_1$ |
| EncP(EncH($he_2$)) | $NID_2$ |
| EncP(EncH($he_3$)) | $NID_3$ |
| EncP(EncH($d_1$)) | $NID_1$ |
| EncP(EncH($d_2$)) | $NID_2$ |
| EncP(EncH($d_3$)) | $NID_3$ |

The mappings shown in Table 5 can be denoted as:

$$[\text{NID\_i} \rightarrow EncP(EncH(\text{PII\_}\{i, 1\})), EncP(EncH(\text{PII\_}\{i, 2\})), \ldots]$$

The mappings of the double-encrypted PII elements from the host dataset to the respective partner-generated anonymous identifiers are sent to the host system.

At the partner system, the protocol encrypts the PII elements from the partner dataset with the partner_key and tags them with the respective partner-assigned identifiers encrypted with the l_key_partner. The mappings of the resulting PII elements from the partner dataset encrypted with the partner_key to the respective partner-assigned identifiers encrypted with the l_key_partner are shown in Table 6 below.

TABLE 6

| Encrypted PII elements from the Partner dataset | Encrypted Partner-assigned identifiers |
|---|---|
| EncP($he_4$) | EncPL($AFID_1$) |
| EncP($he_5$) | EncPL($AFID_2$) |
| EncP($he_2$) | EncPL($AFID_3$) |
| EncP($d_4$) | EncPL($AFID_1$) |
| EncP($d_5$) | EncPL($AFID_2$) |
| EncP($d_6$) | EncPL($AFID_3$) |
| EncP($d_2$) | EncPL($AFID_3$) |

The mappings shown in Table 6 can be denoted as:

$$[EncL(\text{AFID\_j}) \rightarrow EncP(\text{PII\_}\{j, 1\}), EncP(\text{PII\_}\{j, 2\}), \ldots]$$

The mappings of the PII elements from the partner dataset encrypted with the partner_key to the respective partner-assigned identifiers encrypted with the l_key_partner, as shown in Table 6, are sent to the host system.

The host system receives the PII elements from the partner dataset encrypted with the partner_key and encrypts them with the host_key. As a result, the host system now has double-encrypted PII elements derived from the partner dataset as well as double-encrypted PII elements derived from the host dataset. The double-encrypted PII elements derived from the partner dataset are tagged with respective encrypted partner-assigned identifiers, and the double-encrypted PII elements derived from the host dataset are tagged with respective partner-generated anonymous identifiers, as shown in Table 7 below.

TABLE 7

| Double encrypted PII elements from the Host dataset and from the Partner dataset | Encrypted Partner-assigned IDs | Partner-generated anonymous IDs |
|---|---|---|
| EncP(EncH($he_1$)) | | $NID_1$ |
| EncP(EncH($he_2$)) | EncPL($AFID_3$) | $NID_2$ |
| EncP(EncH($he_3$)) | | $NID_3$ |
| EncP(EncH($d_1$)) | | $NID_1$ |
| EncP(EncH($d_2$)) | EncPL($AFID_3$) | $NID_2$ |
| EncP(EncH($d_3$)) | | $NID_3$ |
| EncH(EncP($he_4$) | EncPL($AFID_1$) | |
| EncH(EncP($he_5$) | EncPL($AFID_2$) | |
| EncH(EncP($d_4$) | EncPL($AFID_1$) | |
| EncH(EncP($d_5$) | EncPL($AFID_2$) | |
| EncH(EncP($d_6$) | EncPL($AFID_3$) | |

As explained above and, also, illustrated by Equation 1, encrypting a PII element first with the partner_key and then with the host_key results in the same value as when that PII element is first encrypted with the host_key and then with the partner_key. In Table 7, the rows shown with strike-through indicate that EncP(EncH($he_2$)) is the duplicate of EncH(EncP($he_2$), and EncP(EncH($d_2$)) is the duplicate EncH(EncP($d_2$). Because the PII elements e2 and d2 appear in both the host dataset and the partner dataset, the associated EncP(EncH($he_2$)), EncH(EncP($he_2$), EncP(EncH($d_2$)), and EncH(EncP($d_2$) are tagged with both the associated encrypted partner-assigned identifier EncPL(AFID$_3$) and the associated partner-generated anonymous identifier NID$_2$.

At the host system, the protocol merges the double-encrypted PII elements into clusters and assigns, to each cluster, an anonymous joint identifier. The merging of the double-encrypted PII elements into clusters may be performed based on various clustering mechanism and, in some examples, may utilize respective weights assigned different types of PII elements. In one example, the double-encrypted PII elements tagged with the same partner-generated anonymous identifier are merged in the same cluster. If a double-encrypted PII element in the cluster is tagged with an encrypted partner-assigned identifier, the double-encrypted PII elements tagged with that encrypted partner-assigned identifier are also merged into that cluster, as shown in Table 8 below. In Table 8, the PII elements shown with strike-through indicate the result of EncP(EncH(he$_2$)) being the same value as EncH(EncP(he$_2$)) and EncP(EncH(d$_2$)) being the same value as EncH(EncP(d$_2$)).

TABLE 8

| Clusters of double encrypted PII elements from the Host dataset and from the Partner dataset | Anonymous Joint IDs |
|---|---|
| EncP(EncH(he$_1$)), EncP(EncH(d$_1$)) | JID$_1$ |
| EncP(EncH(he$_2$)), EncP(EncH(d$_2$)), EncH(EncP(d$_6$)) | JID$_2$ |
| EncP(EncH(he$_3$)), EncP(EncH(d$_3$)) | JID$_3$ |
| EncH(EncP(he$_4$)), EncH(EncP(d$_4$)) | JID$_4$ |
| EncH(EncP(he$_5$)), EncH(EncP(d$_5$)) | JID$_5$ |

At the host system, the protocol creates mappings of the anonymous joint identifiers to respective encrypted partner-assigned identifiers, as shown in Table 9.

TABLE 9

| Encrypted Partner-assigned IDs | Anonymous Joint IDs |
|---|---|
| EncPL(AFID$_1$) | JID$_4$ |
| EncPL(AFID$_2$) | JID$_5$ |
| EncPL(AFID$_3$) | JID$_2$ |

The mappings of the anonymous joint identifiers to respective encrypted partner-assigned identifiers, which may be denoted as JID< >EncLP(AFID), are sent to the partner system. The partner system can now derive the mappings between the partner-assigned identifiers and the respective anonymous joint identifiers.

At the host system, the protocol generates a random identifier RID for each c JID and sends the resulting mappings to the partner system. The mappings between the random identifiers, the respective anonymous joint identifiers and the respective random IDs, which may be denoted as RID< >JID< >NID, are shown in Table 10 below.

TABLE 10

| Partner-generated anonymous IDs | Anonymous Joint IDs | Random IDs |
|---|---|---|
| NID$_1$ | JID$_1$ | RID$_1$ |
| NID$_2$ | JID$_2$ | RID$_2$ |
| NID$_3$ | JID$_3$ | RID$_3$ |

The mappings between the random identifiers and the respective partner-generated anonymous identifiers, which may be denoted as RID< >NID, are sent to the partner system. The random identifiers are used in order to prevent the partner system form learning the mapping between the encrypted host-assigned identifiers and the anonymous joint identifiers.

The partner system sends the mappings between the random identifiers and the respective encrypted host-assigned identifiers, which may be denoted as RID< >EncLH (SAID), to the host system. In some examples, the double encrypted PII elements are discarded at the host system before the mappings between the random identifiers and the respective encrypted host-assigned identifiers are received at the host system.

At the host system, the protocol derives, from the RID< >EncLH(SAID), the mappings between the host-assigned identifiers and the respective anonymous joint identifiers, which may be denoted as SAID< >JID. The mappings between the host-assigned identifiers and the respective anonymous joint identifiers are shown in Table 11 below.

TABLE 11

| Host-assigned IDs | Anonymous Joint IDs |
|---|---|
| SAID$_1$ | JID$_1$ |
| SAID$_2$ | JID$_2$ |
| SAID$_3$ | JID$_3$ |

As explained above, the size of the intersection between the host dataset and the partner dataset may be calculated as the number of anonymous joint identifiers that are mapped to a host-assigned identifier or a partner-generated anonymous identifier and, also, to an encrypted partner-assigned identifier. In the instant example, it can be seen in Table 9 and Table 11, one anonymous joint identifier appears in both tables, JID$_2$, and thus the size of the intersection is 1.

The privacy safe joint identification can be executed on a predetermined cadence, using the newly generated joint identifiers for each cadence. It will be noted that the methodology described herein can be used beneficially in any context for determining the intersection of two datasets in a privacy safe manner.

Networked Computing Environment

FIG. 1 is a block diagram showing an example networking environment 100 for exchanging data (e.g., messages and associated content) over a network. The networking environment 100 includes multiple instances of a client device 102, each of which hosts a number of applications, including a messaging client 104 and other applications. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data). A messaging client 104 is shown as displaying external content 105, which can be provided by the third-party servers 110. The external content 105, in some examples, is information that may be of interest to a user and/or information that the provider of the third-party servers 110 would like to make available to a broader audience.

The messaging server system 108 provides server-side functionality via the network 112 to a particular messaging client 104. While certain functions of the networking environment 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the networking environment 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an attribution server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an attribution server 122 configured to facilitate privacy safe attribution process, using the privacy safe joint identification protocol described herein.

The social network server 124 supports various social networking functions and services and makes these functions and services available to the messaging server 118. To this end, the social network server 124 maintains and accesses an entity graph within the database 126. Examples of functions and services supported by the social network server 124 include the identification of other users of the networking environment 100 with which a particular user has relationships or is "following," and also the identification of other entities and interests of a particular user.

Returning to the messaging client 104, features and functions of an external resource (e.g., an application installed on the client device 102 or a web view app executing in the web view in the messaging client 104) are made available to a user via an interface of the messaging client 104. The external resource is often provided by a third party but may also be provided by the creator or provider of the messaging client 104. The messaging client 104 receives a user selection of an option to launch or access features of such an external resource.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

Also shown in FIG. 1 is a developer tools server 125. The developer tools server 125 maintains one or more software developer kits (SDKs) that permit integration of some of the features provided with the messaging server system across a third party application. These features include, for example, a privacy safe joint identification protocol provided by the attribution server 122. An example of a third party application that benefits form integrating a privacy safe joint identification protocol provided by the attribution server 122 is a partner system that maintains a partner dataset of user records.

System Architecture

Figure 2:
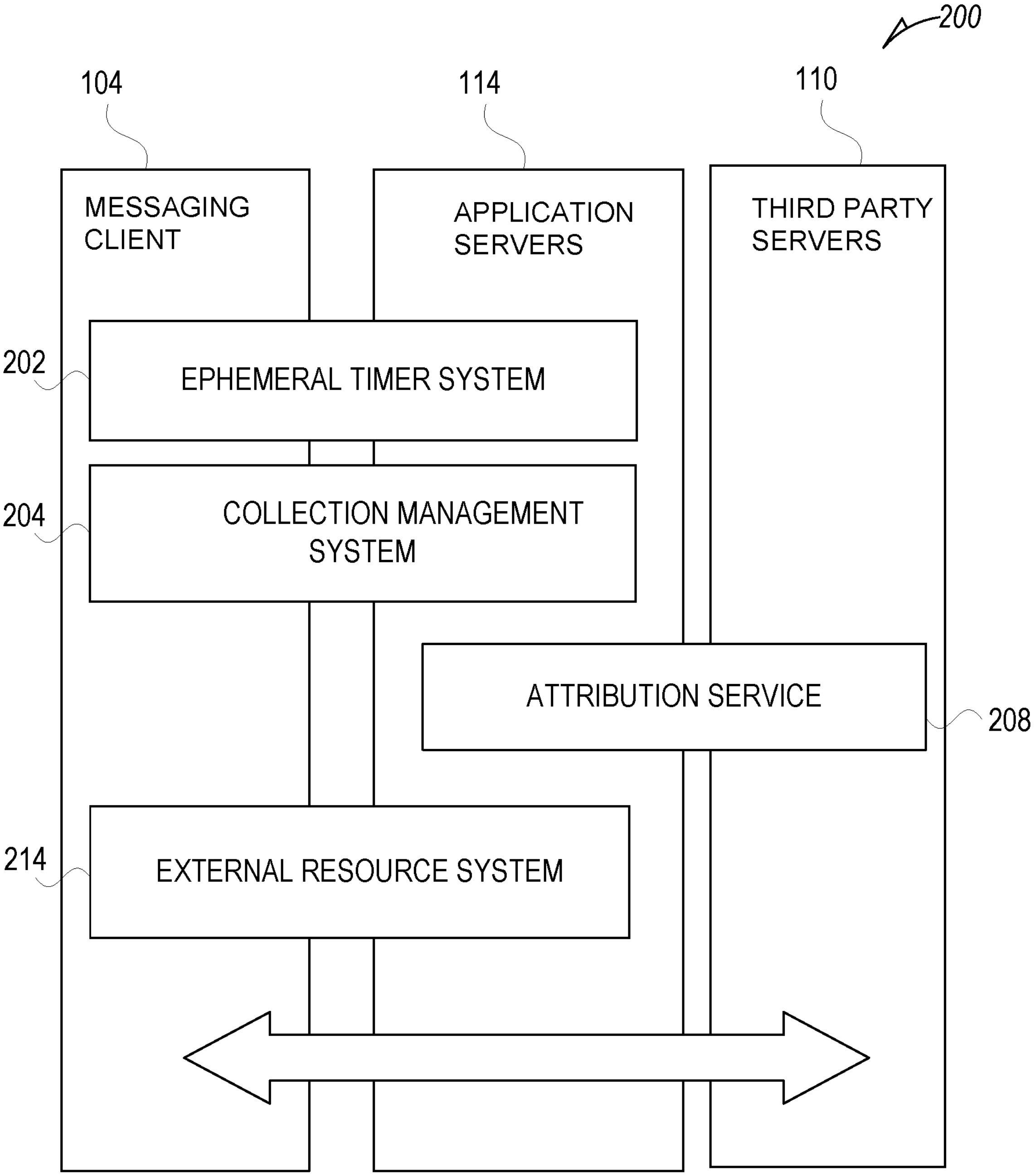
FIG. 2 is a diagrammatic representation of a system configured to provide a joint identification protocol, in accordance with some examples.

FIG. 2 is a block diagram of a system 200, which embodies a number of subsystems that are supported on the client-side by the messaging client 104 and on the sever-side by the application servers 114. These subsystems include, for example, an ephemeral timer system 202, a collection management system 204, an attribution service 208, and an external resource system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104. External content provided by the third party servers 110, in some examples, is displayed by a messaging client 104 in response to detecting a request to present a particular collection at a messaging client 104. The metrics indicative of conversions that follow presentation of an external content item at a messaging client 104 are generated by the attribution service 208.

The attribution service 208 is shown in FIG. 2 as spanning the application servers 114 and the third party servers 110. The attribution service 208 provides various functions that facilitate a privacy safe joint identification protocol described herein, which can be utilized by an external resource provided by the third party servers 110 by means of a Software Development Kit (SDK). In some examples, an SDK configured to support a privacy safe joint identification protocol is provided by the external resource system 214. An external resource, such as a partner system described above, utilizes the SDK to perform operations described above as being performed by the partner system. In order to integrate the functions of the SDK into an external resource, the SDK is downloaded by a third-party server 110 from the messaging server 118 or is otherwise received by the third-party server 110. Once downloaded or received, the SDK is included as part of the application code of an external resource, such as a partner system. The code of the external resource can then call or invoke certain functions of the SDK to integrate features of the attribution service 208 into the external resource.

Process Flow

Figure 3:
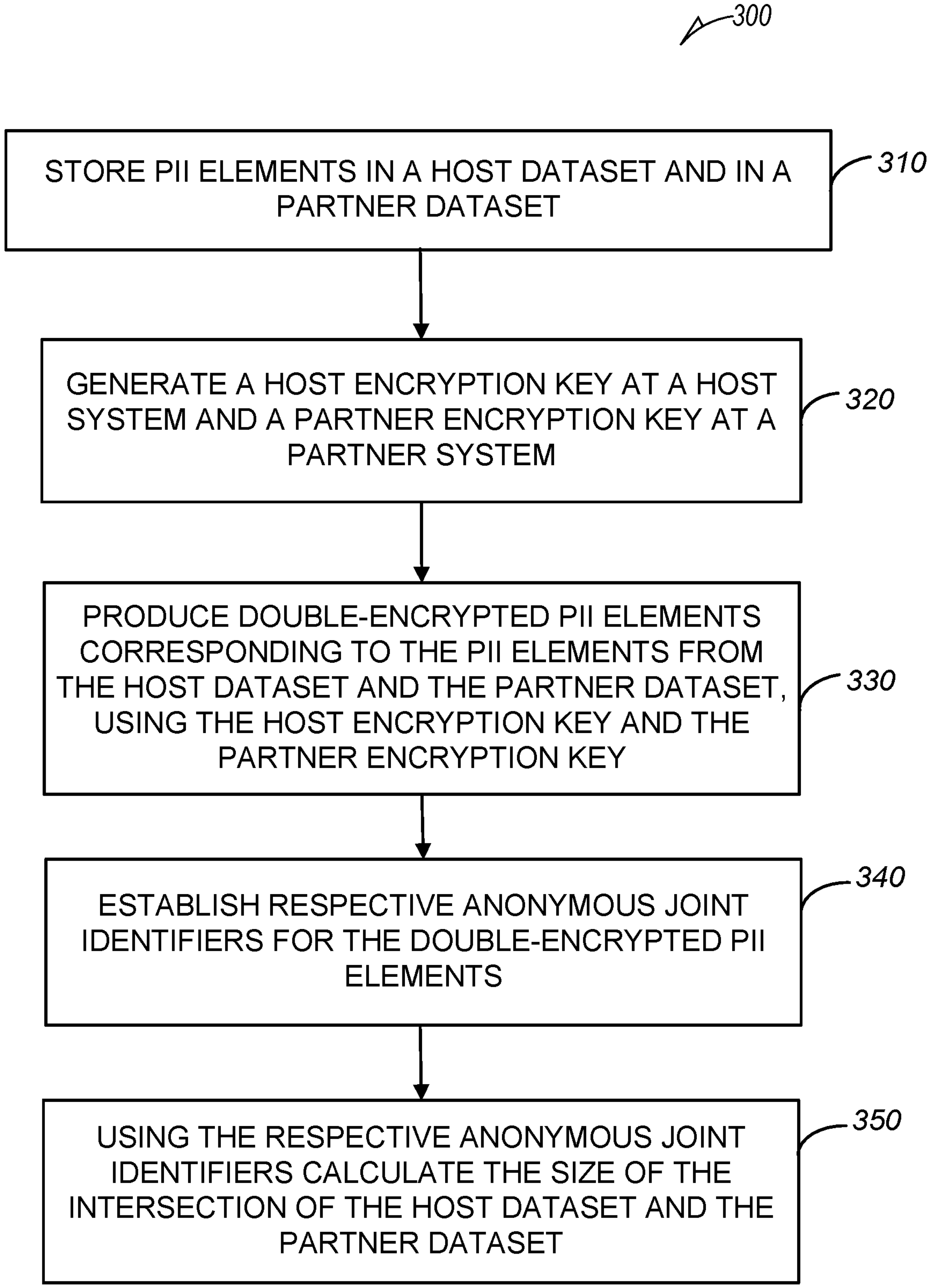
FIG. 3 is a flowchart of a method for calculating the size of the intersection of a host dataset and a partner dataset, in accordance with some examples.

FIG. 3 is a flowchart of a method 300 for privacy safe anonymized identity matching, in accordance with some examples. The method 300 may be performed by processing logic that may comprise hardware (e.g., dedicated logic, programmable logic, microcode, etc.), software, or a combination of both. In one example, some of the processing logic resides at the application servers 114 of FIG. 1.

Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. The method 300 commences with operation 310.

At operation 310, a host system stores a host dataset (for example, a dataset storing user information maintained by the host system configured to display external content that originates from a third party provider), and a partner system associated with the third party provider stores a partner dataset (a dataset storing user information maintained by the partner system that provides the external content to the host system). As explained above, the host system assigns respective host-assigned identifiers to its users, and the partner system assigns respective partner-assigned identifiers to represent their users. The same user may be identified in the host dataset and in the partner dataset by different internal identifiers. An item in a dataset storing user information, whether the host dataset or the partner dataset, is a record comprising an identification of a user (a host-assigned identifier in the host dataset and a partner-assigned identifier in the partner dataset) mapped to a set of PII elements. Examples of PII elements in the dataset records, include an email address, an IP address, and a device identification, for example. The PII elements in the dataset records may be hashed.

At operation 320, a host encryption key is generated at the host system, and a partner encryption key is generated at the partner system.

At operation 330, double-encrypted PII elements are produced by double-encrypting the respective PII elements from records of the host dataset and from records of a partner dataset, using the host encryption key and the partner encryption key. The double-encrypted PII elements derived from the partner dataset are tagged with respective associated encrypted partner-assigned identifiers. The double-encrypted PII elements derived from the host dataset are tagged with respective associated partner-generated anonymous identifiers.

At operation 340, respective anonymous joint identifiers are established for each of the double-encrypted PII elements based on the associated encrypted partner-assigned identifiers and the associated partner-generated anonymous identifiers At operation 350 the respective anonymous joint identifiers are used to calculate an intersection size of the host dataset and the partner dataset. The intersection size of the host dataset and the partner dataset is the number of records that represent the same user in both datasets.

Machine Architecture

Figure 4:
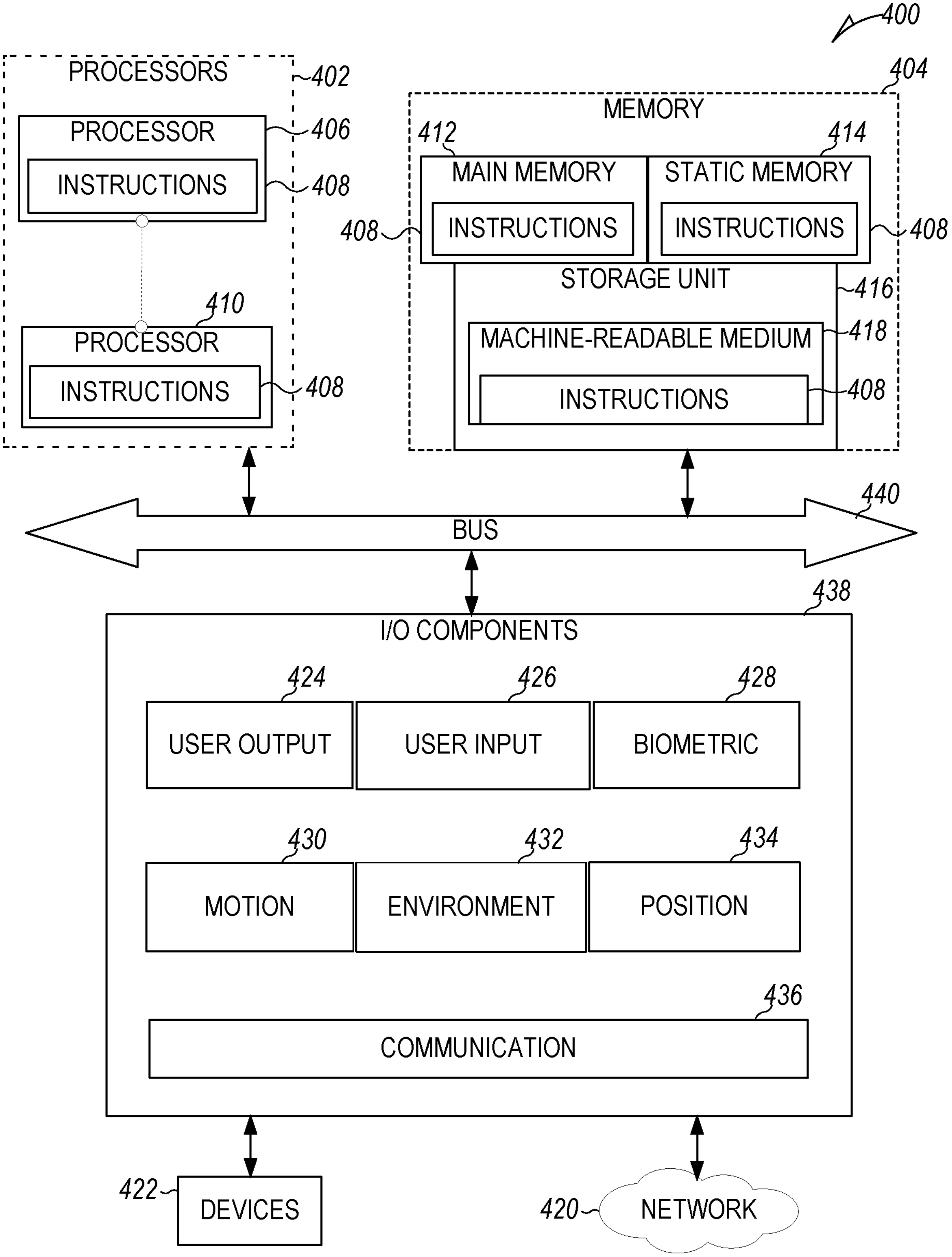
FIG. 4 is a diagrammatic representation of a machine in the form of a computer system, in accordance with some examples within which a set of instructions may be executed for causing the machine to perform any one or more of the methodologies discussed herein, in accordance with some examples.

FIG. 4 is a diagrammatic representation of the machine 400 within which instructions 408 (e.g., software, a program, an application, an applet, an app, or other executable code) for causing the machine 400 to perform any one or more of the methodologies discussed herein may be executed. For example, the instructions 408 may cause the machine 400 to execute any one or more of the methods described herein. The instructions 408 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 408, sequentially or otherwise, that specify actions to be taken by the machine 400. Further, while only a single machine 400 is illustrated, the term "machine" shall also be taken to include a collection of machines that individually or jointly execute the instructions 408 to perform any one or more of the methodologies discussed herein. The machine 400, for example, may comprise the client device 102 or any one of a number of server devices forming part of the messaging server system 108. In some examples, the machine 400 may also comprise both client and server systems, with certain operations of a particular method or algorithm being performed on the server-side and with certain operations of the particular method or algorithm being performed on the client-side.

The machine 400 may include processors 402, memory 404, and input/output I/O components 438, which may be configured to communicate with each other via a bus 440. In an example, the processors 402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 406 and a processor 410 that execute the instructions 408. The term "processor" is intended to include multi-core processors that may comprise two or more independent processors (sometimes referred to as "cores") that may execute instructions contemporaneously. Although FIG. 4 shows multiple processors 402, the machine 400 may include a single processor with a single-core, a single processor with multiple cores (e.g., a multi-core processor), multiple processors with a single core, multiple processors with multiples cores, or any combination thereof.

The memory 404 includes a main memory 412, a static memory 414, and a storage unit 416, both accessible to the processors 402 via the bus 440. The main memory 404, the static memory 414, and storage unit 416 store the instructions 408 embodying any one or more of the methodologies or functions described herein. The instructions 408 may also reside, completely or partially, within the main memory 412, within the static memory 414, within machine-readable medium 418 within the storage unit 414, within at least one of the processors 402 (e.g., within the Processor's cache memory), or any suitable combination thereof, during execution thereof by the machine 400.

The I/O components 438 may include a wide variety of components to receive input, provide output, produce output, transmit information, exchange information, capture measurements, and so on. The specific I/O components 438 that are included in a particular machine will depend on the type of machine. For example, portable machines such as mobile phones may include a touch input device or other such input mechanisms, while a headless server machine will likely not include such a touch input device. It will be appreciated that the I/O components 438 may include many other components that are not shown in FIG. 4. In various examples, the I/O components 438 may include user output components 424 and user input components 426. The user output components 424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 438 may include biometric components 428, motion components 430, environmental components 432, or position components 434, among a wide array of other components. For example, the biometric components 428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 430 include acceleration sensor components (e.g., accelerometer), gravitation sensor components, rotation sensor components (e.g., gyroscope).

The environmental components 432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 434 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 438 further include communication components 436 operable to couple the machine 400 to a network 420 or devices 422 via respective coupling or connections. For example, the communication components 436 may include a network interface Component or another suitable device to interface with the network 420. In further examples, the communication components 436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 422 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 436, such as location via Internet Protocol (IP) geolocation, location via Wi-Fi® signal triangulation, location via detecting an NFC beacon signal that may indicate a particular location, and so forth.

The various memories (e.g., main memory 412, static memory 414, and memory of the processors 402) and storage unit 416 may store one or more sets of instructions and data structures (e.g., software) embodying or used by any one or more of the methodologies or functions described herein. These instructions (e.g., the instructions 408), when executed by processors 402, cause various operations to implement the disclosed examples.

The instructions 408 may be transmitted or received over the network 420, using a transmission medium, via a network interface device (e.g., a network interface component included in the communication components 436) and using any one of several well-known transfer protocols (e.g., hypertext transfer protocol (HTTP)). Similarly, the instructions 408 may be transmitted or received using a transmission medium via a coupling (e.g., a peer-to-peer coupling) to the devices 422.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 402 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically crasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Software Architecture

Figure 5:
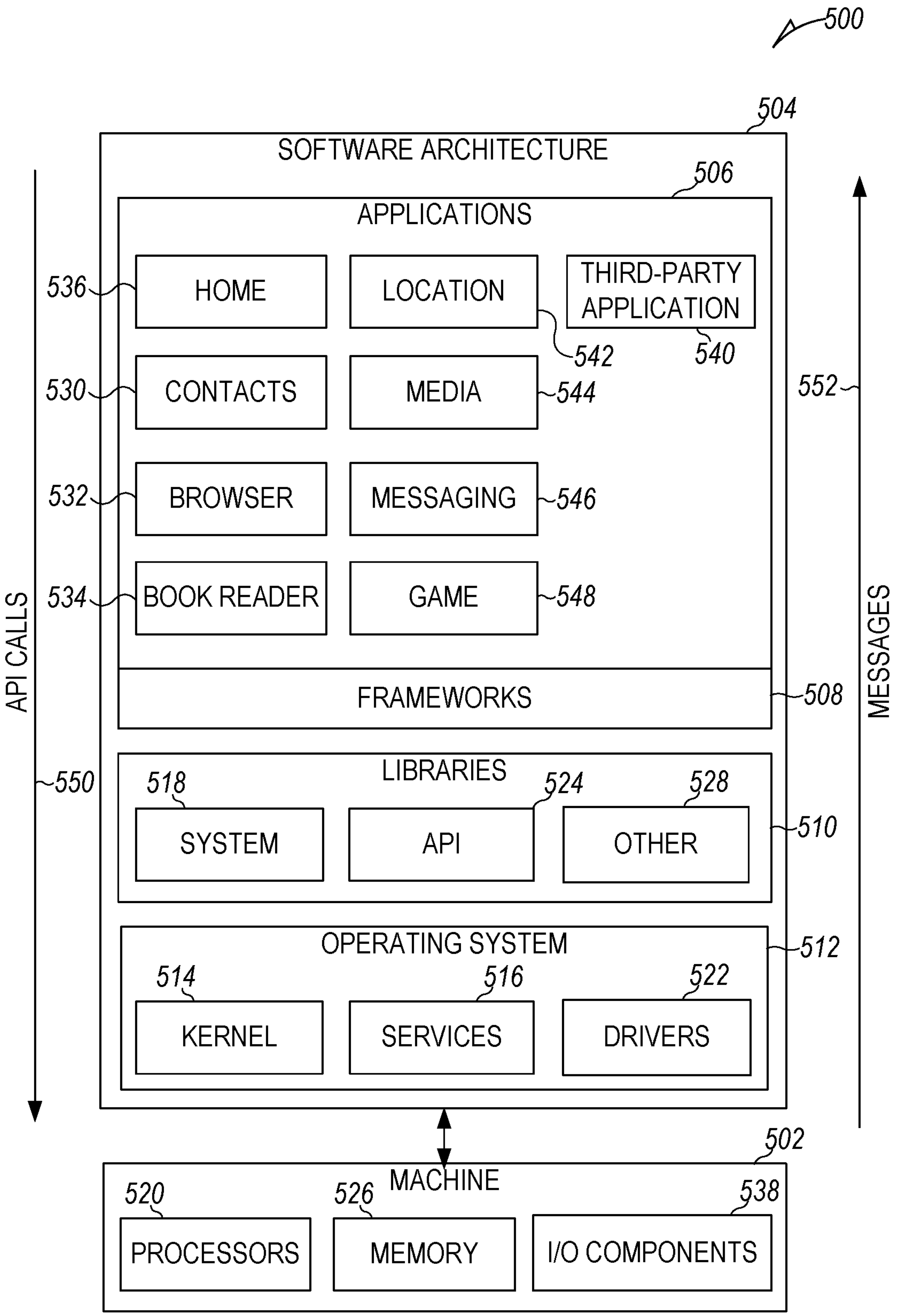
FIG. 5 is a block diagram showing a software architecture within which examples may be implemented.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 402 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:

double-encrypting user information from records of a host dataset using at least a host encryption key and a partner encryption key provided by a partner system;

accessing encrypted partner identifiers, the encrypted partner identifiers being encrypted using a partner encryption key;

tagging elements from the double-encrypted user information encrypted using the host encryption key with respective associated encrypted partner identifiers;

based on the associated encrypted partner identifiers and associated partner anonymous identifiers, establishing respective anonymous joint identifiers for each cluster of the double-encrypted user information;

using the respective anonymous joint identifiers to calculate an intersection size of the host dataset and a partner dataset;

discarding the double-encrypted user information prior to providing a mapping of the anonymous joint identifiers and the encrypted partner identifiers; and providing the mapping between the anonymous joint identifiers and the encrypted partner identifiers to a partner system by generating random identifiers for individual anonymous joint identifiers, a first random identifier of the random identifiers being associated with a particular anonymous joint identifier and an encrypted partner identifier.

2. The method of claim 1, comprising generating the host encryption key, wherein the partner dataset and the partner encryption key are provided by a partner system.

3. The method of claim 2, wherein the double-encrypting user information comprises:

encrypting the respective user information from records of the host dataset using the host encryption key to produce host-encrypted user information;

providing the host-encrypted user information to the partner system; and receiving the host-encrypted user information encrypted using the partner encryption key.

4. The method of claim 3, wherein the received host-encrypted user information encrypted using the partner encryption key are tagged with the respective associated partner anonymous identifiers.

5. The method of claim 3, wherein the receiving of the host-encrypted user information encrypted using the partner encryption key comprises receiving mappings of the respective associated partner anonymous identifiers to the host-encrypted user information encrypted using the partner encryption key.

6. The method of claim 3, wherein the providing of the host-encrypted user information to the partner system comprises providing mappings of respective encrypted host identifiers to the respective host-encrypted user information.

7. The method of claim 2, wherein the double-encrypting user information comprises:

receiving the respective user information from records of the partner dataset encrypted using the partner encryption key; and encrypting using the host encryption key the respective user information from records of the partner dataset encrypted using the partner encryption key.

8. The method of claim 7, wherein the respective user information from records of the partner dataset encrypted using the partner encryption key received are tagged with the respective associated encrypted partner identifiers.

9. The method of claim 2, wherein the using of the respective anonymous joint identifiers to calculate the intersection size of the host dataset and the partner dataset comprises communicating to the partner system mappings between the associated encrypted partner identifiers and the respective anonymous joint identifiers.

10. The method of claim 1, wherein the respective user information from records of the host dataset and the partner dataset include hashed email addresses and hashed Internet Protocol (IP) addresses.

11. A system comprising:

one or more processors; and a non-transitory computer readable storage medium comprising instructions that when executed by the one or processors cause the one or more processors to perform operations comprising:

double-encrypting user information from records of a host dataset using at least a host encryption key and a partner encryption key provided by a partner system;

accessing encrypted partner identifiers, the encrypted partner identifiers being encrypted using a partner encryption key;

tagging elements from the double-encrypted user information encrypted using the host encryption key with respective associated encrypted partner identifiers;

based on the associated encrypted partner identifiers and associated partner anonymous identifiers, establishing respective anonymous joint identifiers for each cluster of the double-encrypted user information;

using the respective anonymous joint identifiers to calculate an intersection size of the host dataset and a partner dataset;

discarding the double-encrypted user information prior to providing a mapping of the anonymous joint identifiers and the encrypted partner identifiers; and providing the mapping between the anonymous joint identifiers and the encrypted partner identifiers to a partner system by generating random identifiers for individual anonymous joint identifiers, a first random identifier of the random identifiers being associated with a particular anonymous joint identifier and an encrypted partner identifier.

12. A machine-readable non-transitory storage medium having instruction data executable by a machine to cause the machine to perform operations comprising:

double-encrypting user information from records of a host dataset using at least a host encryption key and a partner encryption key provided by a partner system;

accessing encrypted partner identifiers, the encrypted partner identifiers being encrypted using a partner encryption key;

tagging elements from the double-encrypted user information encrypted using the host encryption key with respective associated encrypted partner identifiers;

based on the associated encrypted partner identifiers and associated partner anonymous identifiers, establishing respective anonymous joint identifiers for each cluster of the double-encrypted user information;

using the respective anonymous joint identifiers to calculate an intersection size of the host dataset and a partner dataset;

discarding the double-encrypted user information prior to providing a mapping of the anonymous joint identifiers and the encrypted partner identifiers; and providing the mapping between the anonymous joint identifiers and the encrypted partner identifiers to a partner system by generating random identifiers for individual anonymous joint identifiers, a first random identifier of the random identifiers being associated with a particular anonymous joint identifier and an encrypted partner identifier.

13. The method of claim 1, wherein the host dataset includes a host identifier that is assigned by a host system and the partner identifiers are assigned by a partner system.

14. The method of claim 1, wherein producing the double-encrypted user information is further based on a second partner encryption key.

15. The method of claim 14, further comprising generating the host encryption key at a host system, wherein a partner dataset and the second partner encryption key are provided by a partner system.

16. The method of claim 1, wherein the double-encrypted user information is further from records of a partner dataset, each record in the partner dataset comprising a partner assigned identifier mapped to respective PII elements.

17. The method of claim 1, further comprising encrypting the partner identifiers prior to accessing the encrypted partner identifiers.

18. The method of claim 1, further comprising:

based on the associated encrypted partner identifiers and the associated partner anonymous identifiers, establishing respective partner anonymous identifiers for each of the double-encrypted user information; and using the respective partner anonymous identifiers to calculate an intersection size of the host dataset and the partner dataset.

19. The method of claim 1, wherein the double-encrypted user information is derived from the host dataset are tagged with respective associated partner anonymous identifiers.

20. The method of claim 1, further comprising merging the double-encrypted user information into clusters.

* * * * *